(12) United States Patent
Si et al.

(10) Patent No.: US 9,340,428 B2
(45) Date of Patent: May 17, 2016

(54) METHOD FOR INCREASING DENSITY OF ALIGNED CARBON NANOTUBES

(71) Applicant: Peking University, Beijing (CN)

(72) Inventors: Jia Si, Beijing (CN); Zhiyong Zhang, Beijing (CN); Lianmao Peng, Beijing (CN)

(73) Assignee: Peking University, Beijing (CN)

( * ) Notice: Subject to any disclaimer, the term of this patent is extended or adjusted under 35 U.S.C. 154(b) by 29 days.

(21) Appl. No.: 14/453,831

(22) Filed: Aug. 7, 2014

(65) Prior Publication Data

US 2015/0298975 A1    Oct. 22, 2015

(30) Foreign Application Priority Data

Apr. 17, 2014   (CN) .......................... 2014 1 0154960

(51) Int. Cl.
| | | |
|---|---|---|
| *H05H 1/00* | (2006.01) | |
| *C01B 31/02* | (2006.01) | |
| *B82Y 30/00* | (2011.01) | |
| *B82Y 40/00* | (2011.01) | |

(52) U.S. Cl.
CPC ............. *C01B 31/0253* (2013.01); *B82Y 30/00* (2013.01); *B82Y 40/00* (2013.01); *C01B 31/0226* (2013.01)

(58) Field of Classification Search
CPC   C01B 31/0253; C01B 31/0226; B82Y 30/00; B82Y 40/00; B82Y 99/00
See application file for complete search history.

(56) References Cited

U.S. PATENT DOCUMENTS

| | | | | |
|---|---|---|---|---|
| 6,855,376 | B2 * | 2/2005 | Hwang | B82Y 30/00 204/192.1 |
| 7,785,669 | B2 * | 8/2010 | Wang | B82Y 30/00 216/96 |
| 2010/0255323 | A1 * | 10/2010 | Nakamura | H01B 1/22 428/457 |
| 2011/0109006 | A1 * | 5/2011 | Zheng | B82Y 10/00 264/112 |

* cited by examiner

*Primary Examiner* — Michael Wieczorek
(74) *Attorney, Agent, or Firm* — SV Patent Service

(57) ABSTRACT

The present application relates to a method of increasing density of aligned carbon nanotubes. Firstly, aligned carbon nanotubes grown on a substrate is transferred to a stretched retractable film. The retractable film is then shrunk along a direction which is perpendicular to the alignment direction of the carbon nanotubes to obtain high density carbon nanotubes. The array of aligned carbon nanotubes is finally transferred from the retractable film to a target substrate. The disclosed method can efficiently obtain high-density high-quality aligned carbon nanotubes at low cost.

16 Claims, 4 Drawing Sheets

METHOD FOR INCREASING DENSITY OF ALIGNED CARBON NANOTUBES

CROSS-REFERENCES TO RELATED APPLICATIONS

This application claims the benefit of CN patent application No. 201410154960.3 filed on Apr. 17, 2014, entitled "Method for Increasing Density of Aligned Arrays of Carbon Nanotubes", which is incorporated herein by reference in its entirety.

BACKGROUND OF THE INVENTION

The present application relates to technologies for manufacturing nano-scale electronic devices, and in particular, to methods of obtaining high-density aligned carbon nanotubes suitable for making such devices.

Carbon nanotubes (CNT) are a one-dimensional (1D) material having ultra-long electron mean free path. Comparing to conventional silicon-based Complementary Metal Oxide Semiconductor (CMOS) field-effect transistors, carbon nanotube field-effect transistors (CNFET) have extraordinary electronic performance and controllability over static charges, which is a hopeful to replace silicon-based chip semiconductor technologies.

CNFET based on a single carbon nanotube has low drive current, and thus is easily disturbed by external parasitic capacitance, which results in slow speed. To reduce parasitic effects and improve device performance, it is essential to increase the density of carbon nanotubes in CNFETs. The ideal density for aligned carbon nanotubes is 100-200 tubes/µm for fabricating high speed and low energy consumption carbon nanotube transistor.

Conventional CNT manufacturing technologies, however, cannot produce high-quality high-density aligned carbon nanotubes. One conventional method is the direct growth method. In this method, CNTs can be grown directly quartz substrate to obtain an average density of 10-20 CNTs/µm in a single growth cycle, and an average density of 40-50 CNTs/µm after multiple growth cycles. As the density increases, nanotubes tend to intertwine, bend, and overlap, thus blocking the subsequent growth in an aligned fashion. Thus the direct-growth method cannot produce high density and highly aligned CNTs. Another CNT manufacturing method is based on transfer using Langmuir-Blodgett (TB) membranes; it can produce large area of uniformly aligned CNTs. This method involves purification, ultrasonic treatment, and modification, which make the product CNTs very short and contain lots of defects. Thus the LB membrane method is also not suitable for manufacturing highly aligned high-density CNTs for fabricating high performance electronic devices.

U.S. Patent Publication No. 20090028779 A1 disclosed a method for making high density CNT array, including: providing substrate with a carbon nanotube array perpendicular to it; providing an elastic film; stretching the elastic film uniformly, and covering the elastic film on the carbon nanotube array; applying pressure uniformly on the elastic film; shrinking the elastic film while maintaining the pressure; and separating the carbon nanotube array from the elastic film to acquire a high-density carbon nanotube array. Nevertheless, this method can only increase the density of the carbon nanotubes along the direction perpendicular to the substrate. On the other hand the density in directions parallel to the substrate is the most important for fabricating electronic devices. In these directions, the carbon nanotubes have large contact areas with the substrate, resulting in strong Van der Waals force between the nanotubes and substrate. Shrinking the elastic film in directions parallel to the substrate tend to bend and intertwine the nanotubes. Moreover, the step of physically separating the carbon nanotubes from the elastic film may work for high density intertwined carbon nanotubes (aligned perpendicular to the substrate, i.e. CNT forest), but cannot work with lower density carbon nanotubes aligned parallel to the substrate. Furthermore, the disclosed method suffers large material loss because the carbon nanotubes are strongly attracted to and adhered to the elastic film. In sum, the disclosed method is unsuitable for making high density, high quality carbon nanotube arrays that are aligned parallel to substrate, which are essential for fabricating electronic devices.

There is therefore a critical need for making high-density carbon nanotubes that are aligned parallel to the substrates, which is essential for developing high performance carbon nanotube-based electronics.

SUMMARY OF THE INVENTION

The present disclosure attempts to overcome the drawbacks in the conventional methods by providing a method of making high-density and high-quality aligned carbon nanotube array. The density of the carbon nanotubes is increased in a transfer process.

In one general aspect, the disclosed method first grows carbon nanotubes that are aligned parallel to a substrate and transfers the carbon nanotubes onto a uni-directionally stretched retractable film. The retractable film can be made of a polymeric material such as rubber, polyester, and shape memory alloy. The retractable film is allowed to retract and shrunk along the direction perpendicular to the carbon nanotubes, which increases the density of the parallel aligned carbon nanotubes. The carbon nanotubes are finally transferred from the unidirectional stretchable retractable film to a target substrate.

The disclosed method includes one or more of the following steps:

1) transferring aligned carbon nanotubes from a substrate to a uni-directionally stretched retractable film, and aligning the carbon nanotubes perpendicular to the retracting direction of the unidirectional stretchable retractable film;

2) shrinking the retractable film along the retracting direction to increase the density of the carbon nanotubes; and 3) transferring denser carbon nanotubes from the unidirectional stretchable retractable film to a target substrate using a chemical or a mechanical method.

In the present disclosure, the carbon nanotubes can be grown on any substrates by any methods. For example, the carbon nanotubes can be grown on quartz or sapphire substrate using chemical vapor deposition (CVD). Carbon nanotubes can form arrays, or are distributed in low density, or forms a thin film.

In the present disclosure, the stretchable retractable film can be made of rubber, polyester, shape memory alloy, and organic or inorganic stretchable materials. The stretchable retractable film is first stretched along one direction and fixed in the stretched state. The carbon nanotubes are transferred onto the stretchable retractable film with the carbon nanotubes aligned perpendicular to the stretching (and thus retracting) direction. Finally, the retractable film is allowed to slowly relax to increase the density of the carbon nanotubes. Some stretchable materials, such as heat shrinkable polyethylene terephthalate (PET), can shrink by 80-90% when heated to certain temperatures. Some stretchable materials, such as shape memory alloy, can be stretched at a low temperature, and retracted at a higher temperature. The disclosed method is compatible with, but not limited to, the materials stretchable materials. Other elastic materials can also be suitable for the method disclosed in the present application.

In step 1), a film of poly(methyl methacrylate) (PMMA) is spin-coated on a substrate grown with carbon nanotubes thereon. After PMMA dries, the substrate is dipped in an HF buffer solution. The PMMA thin film that carries the carbon nanotubes falls off from substrate. The PMMA film that carries the carbon nanotubes is brought close to and attached a stretched retractable film. The carbon nanotubes are aligned perpendicular to the stretching direction of the retractable film. After the water moisture between the PMMA and the retractable film has evaporated, a composite of strongly bonded CNTs, PMMA, and retractable film is obtained.

In step 1), a metal layer can be used as a sacrificial layer in the lift-off of the retractable film. A layer of soft and ductile metal material, such as gold or aluminum, is first deposited on the stretched retractable film. A PMMA film carrying carbon nanotubes is brought close to and the PMMA film is attached to the metal film. A composite of strongly bonded CNTs, PMMA, metal film, and retractable film is obtained after the water moisture between the PMMA and the metal film has evaporated. The retractable film can be lifted off by dipping the composite in an etchant for a short period of time, which etches the metal film and separates the retractable film. The high etching rate can effectively prevent introducing impurities into the composite as it may occur if the sacrificial metal film is not used in removing the retractable film.

In step 2), the refraction of the retractable film can performed at a temperature above PMMA's glass transition temperature. At these temperatures, PMMA is close to a glassy state, and can adapt its shape to the contraction of the retractable film, which helps to maintain the parallel orientations of the carbon nanotubes.

In step 3), after shrinking of the retractable film, the composite of CNTs, PMMA, and retractable film is attached onto target substrate with the carbon nanotube side contacting the target substrate. After the water is evaporated between the target substrate and the composite, the composite is tightly bonded to the target substrate. Finally, the retractable film is first dissolved. The retractable film may shrink somewhat during its dissolution, but the CNTs on the target substrate are protected from damage by the PMMA film. The PMMA is subsequently dissolved by a different solvent, leaving the carbon nanotubes intact on the target substrate.

When a metal layer is as a sacrificial layer, the retractable film is separated from the composite attached to the target substrate by etching off the sacrificial metal layer in a metal etchant. The retractable film could also be lifted off mechanically.

In step 3), suitable target substrates include conductive materials such as Si/SiO2, insulating materials such as sapphire and quartz, and flexible materials such as Polydimethlsiloxane (PDMS), Indium Tin Oxides (ITO), and Polyethylene terephthalate (PET), etc.

The surface of the target substrate can be treated before step 3) to increase the hydrophilic of the target substrate's surface, which helps it to strongly bind with the CNTs on the PMMA. Alternatively, the target substrate can be modified by amino groups which can be more strongly bound with the CNTs. Thus surface treatment of the target substrate can include two steps: hydrophilic treatment can include UV irradiation or oxygen plasma cleaning. Surface modification can involve dipping the target substrate in APTES (3-Aminopropyl triethoxysilane) solution for about 10 minutes, which, after drying, produces a layer of organic molecules containing amino groups.

The presently disclosed methods have one or more of the following advantages compared to conventional techniques:

1. The disclosed methods can significantly increase the density of carbon nanotubes that are aligned parallel to the substrate. Using PMMA film as a protective layer, the disclosed method overcomes the problem that carbon nanotubes parallel to substrate cannot directly glide on substrate. Meanwhile, no pressure was applied to bend or intertwine the carbon nanotubes. Moreover, the disclosed method can use chemical methods to separate the retractable film from the carbon nanotubes, which has higher success rate and avoids material loss compared to the conventional mechanical lift-off method.

2. The disclosed methods can obtain ultra-high density parallel carbon nanotubes. In comparison to conventional direct growth methods, the disclosed methods can use low-density high-quality carbon nanotube as the source material. Because of low requirement on the CNT density, the preparation can be more easily controlled to produce uniform-density high quality carbon nanotubes having uniform lengths and low defects, and without intertwining, bending, overlapping. In the shrinking process, the carbon nanotubes are protected by a PMMA film and thus will not intertwine with each other, which leads to significant increase in CNT density. Assuming that the average density of single cycle of CNT growth is 20 nanotubes/µm, the disclosed method can increase the CNT density to 180 sticks/µm when a 10 times stretchable material is used in the retractable film, which fully satisfies the requirements of high performance nano devices and integrated circuits.

3. The present application discloses a high-quality carbon nanotube array. Different from the Langmuir-Blodgett method, carbon nanotubes in the disclosed methods do not go through purification, ultrasound, molecular modification, and other complex treatment processes. Langmuir-Blodgett method can only obtain short carbon nanotubes with their lengths in a few nanometers, while the presently disclosed method can keep the original lengths of carbon nanotubes, which can be in a range of hundreds of microns, which is very convenient for fabricating large scale integrated circuits. Moreover, ultra-sonication in Langmuir-Blodgett method produces lots of defects in carbon nanotubes. Molecular modification in Langmuir-Blodgett method can also reduce electron mobility in the carbon nanotubes. In contrast, the carbon nanotubes obtained by the current methods have very low defect density and no modified molecular groups, which enable the carbon nanotubes to possess the excellent properties of the natively grown carbon nanotubes.

These and other aspects, their implementations and other features are described in detail in the drawings, the description and the claims.

BRIEF DESCRIPTION OF THE DRAWINGS

FIG. 2A shows spin coating electron beam resist PMMA 600K the carbon nanotubes on the quartz substrate from FIGS. 1A and 1B.

FIG. 2B shows the composite of the PMMA film and carbon nanotubes after the quartz substrate is etched off in a HF Buffer solution.

FIG. 2C shows attaching the PMMA film in the composite structure of FIG. 2B on to a retractable film.

FIG. 2D shows a retractable film coated with a metal film.

FIG. 2E shows attaching the PMMA film in the composite structure of FIG. 2B on to metal film on the retractable film of FIG. 2D.

FIG. 3A shows a retracting process associated with the composite structure of FIG. 2C.

FIG. 3B shows a retracting process associated with the composite structure of structure of FIG. 2E.

FIG. 4A shows binding the structure of FIG. 3A onto a silicon wafer whose surface has been modified by APTES.

FIG. 4B shows binding the structure of FIG. 3B onto a silicon wafer having a surface modified by APTES.

FIG. 4C shows the structure after the retractable film is dissolved by a polar solvent or lifted off after the sacrificial metal film is etched off by a metal etchant.

FIG. 4D shows the carbon nanotubes on the target substrate after the PMMA film is dissolved by acetone.

FIG. 4E is a top view of an array of parallel aligned carbon nanotubes on the target substrate in FIG. 4D.

DETAILED DESCRIPTION OF THE INVENTION

The present invention will hereinafter be described in further detail by examples. However, it is to be understood that these examples can be modified into other various forms, and the scope of the present invention is not intended to be limited to such examples.

Implementation Example 1

PDMS is used as a stretchable material.

Figure 1A:
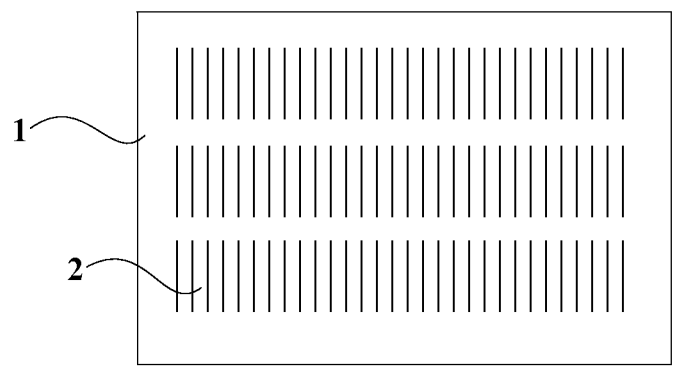
FIG. 1A is a top view of an array of carbon nanotubes parallel aligned on a quartz substrate grown by CVD.
Figure 1B:
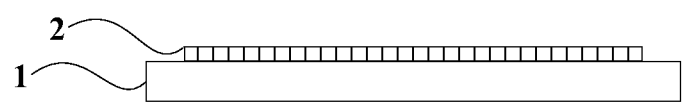
FIG. 1B is a cross-sectional view of array of carbon nanotubes on the quartz substrate.

1. An array of parallel aligned carbon nanotubes 2 is grown on a quartz substrate 1 using CVD (as shown in FIGS. 1A and 1B). Examples of catalysts used in CVD include $CuCl_2$ solution, $FeCl_3$ solution, and iron deposited by electron beam evaporation. Common sources of carbon include $CH_4$, $C_3H_7OH$, etc.

Figure 2A:
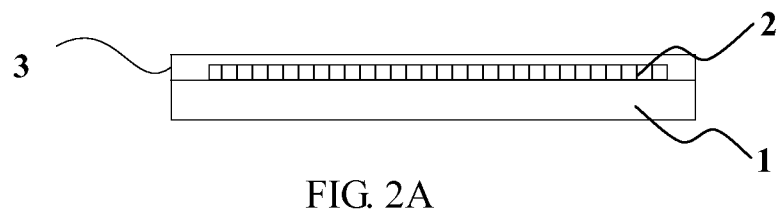
FIGS. 2A-2E show the process of transferring carbon nanotubes from a quartz substrate onto PDMS.
Figure 2B:
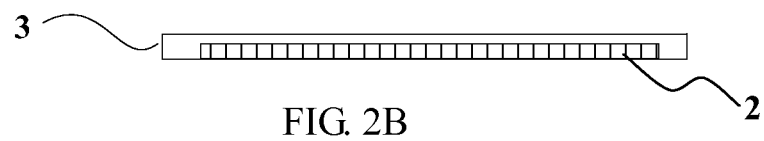
Figure 2C:
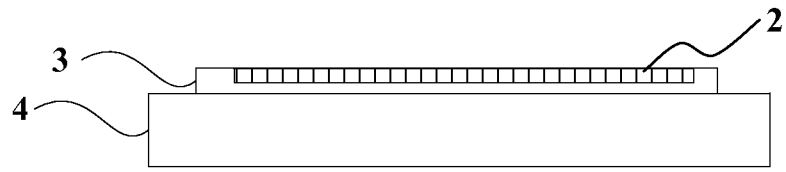

2. The array of nanotube array is transferred to PDMS (FIGS. 2A-2E). (1) PMMA 600K 3 is spin-coated on the array of parallel aligned carbon nanotubes 2 grown on the quartz substrate 1 at a rotation speed at 2000 rad/s (as shown in FIG. 2A). After PMMA dries naturally, the composite is immersed in a HF buffer (7:1) solution for about 48 hours to etch the quartz substrate 1. A composite of a PMMA film 3 and the carbon nanotubes 2 is obtained (as shown in FIG. 2B). (2) The composite is then immersed in deionized water for 10 minutes to remove residual HF remained on the PMMA film 3. Then the PMMA film 3 is attached to a stretched PDMS film 4 with the carbon nanotubes 2 positioned outward. The PMMA film 3 and the stretched PDMS film 4 are strongly bonded after the water in between has evaporated, as shown in FIG. 2C. It should be noted that the carbon nanotubes 2 are aligned to be perpendicular to the stretching direction of the PDMS film 4.

Figure 3A:
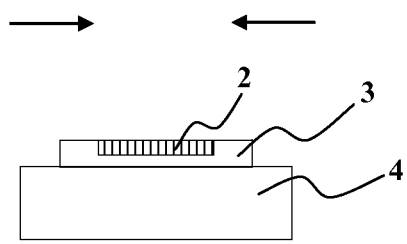
FIGS. 3A-3B show the retracting process of the stretched retractable film along the direction perpendicular to the alignment direction of the carbon nanotubes.

3. The stretched PDMS film 4 is shrunk at a high temperature (shown in FIG. 3A). The lateral shrinkage of the PDMS film 4 can be about 90%, which results in 9 times increase in the density of carbon nanotubes 2.

Figure 4A:
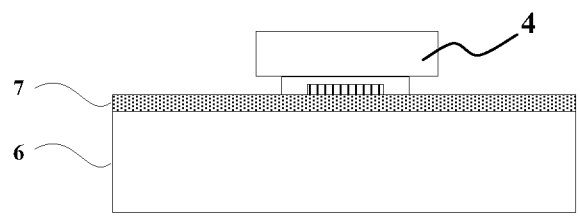
FIGS. 4A-4E show the process of transferring carbon nanotubes from a retractable film to a target substrate.
Figure 4B:
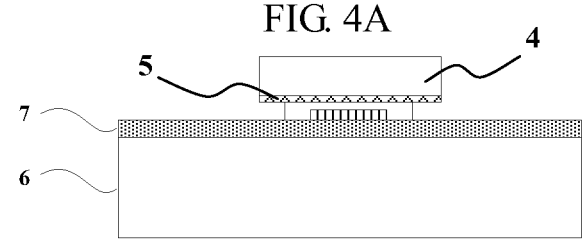
Figure 4C:
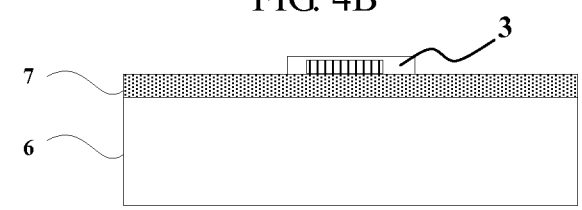

4. After the lateral shrinkage, the composite of PDMS, PMMA, and high-density carbon nanotubes (shown in FIG. 3A) are transferred to a silicon wafer 6. (1) The hydrophilicity of the surface of the silicon wafer 6 is enhanced by ultraviolet irradiation or plasma bombardment. (2) The silicon wafer 6 is immersed in APTES solution for molecular modification to form a layer 7 of organic molecules of APTES on the surface of the silicon wafer 6. (3) A drop of deionized water is disposed on the silicon wafer 6. The composite of PDMS, PMMA, and high-density carbon nanotubes is brought to the silicon wafer 6 to attach the array of carbon nanotubes 2 to the layer 7 of organic molecules on the silicon wafer 6. The composite is closely bonded to the silicon wafer 6 after the water between the silicon wafer 6 and the PMMA film 3 is evaporated (FIG. 4A). (4) The PDMS film 4 is dissolved using an organic solvent (FIG. 4C). The PMMA film 3 is subsequently dissolved using acetone (FIG. 4D), followed by drying with a nitrogen gas. An array of high-density carbon nanotubes 2 is obtained on the silicon wafer 6.

Sacrificial Metal Layer Technology

Figure 2D:
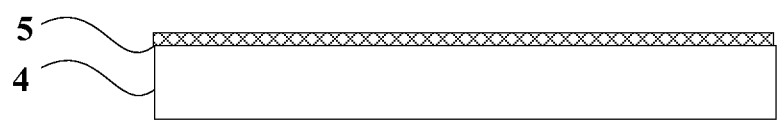
Figure 2E:
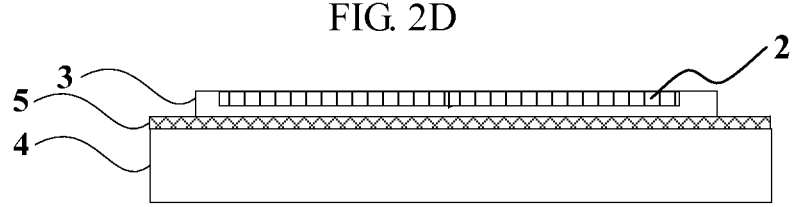
Figure 3B:
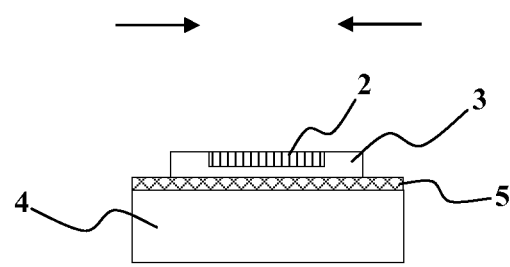
Figure 4D:
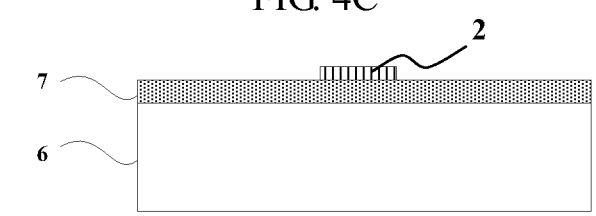
Figure 4E:
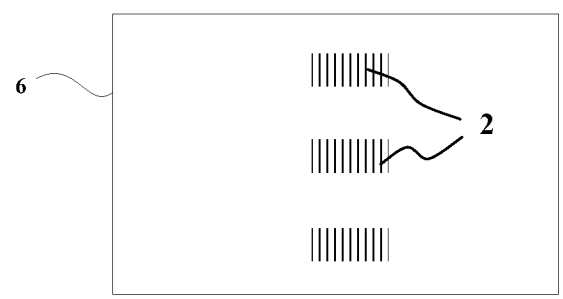

A metal layer 5 is deposited on a surface of the stretched PDMS film 4 as a sacrificial layer in the later lift-off process as shown in FIG. 2D. The metal layer 5 can for example be made of ductile gold 5 about 100 nm in thickness. Then the composite of the PMMA film 3 and the carbon nanotubes 2 (FIG. 2B) is attached to the metal layer 5 with the PMMA film 3 in contact with the metal layer 5 as shown in FIG. 2E. The retracting direction of the stretched PDMS film 4 is perpendicular to the alignment direction of the carbon nanotubes 2. After the water in the gap evaporates, a strongly bonded structure is obtained comprising from the top down: the carbon nanotubes 2, the PMMA film 3, the metal layer 5, and the PDMS film 4 (FIG. 2E). The PDMS film 4 is then allowed to retract and shrink at PMMA's glass transition temperature or above (FIG. 3B). At last, the array of high-density aligned carbon nanotubes 2 is transferred from the composite to a silicon wafer 6: (1) The silicon wafer 6 receives the same surface treatments as in step 4 in the Implementation Example 1 described above. Then, as shown in FIG. 4B, the composite of carbon-nanotubes-PMMA-metal-PDMS is attached to the silicon wafer 6 with the carbon nanotubes 2 contacting the layer 7 of organic molecules on the silicon wafer 6. (2) The metal layer 5 is then dissolved by a metal etchant, resulting lift off of the PDMS film 4, as shown in FIG. 4C. (3) The PMMA film 3 is then dissolved using acetone, as shown in FIG. 4D, and blown dry with a nitrogen gas. An array of high density carbon nanotubes 2 is now transferred to the silicon wafer 6 as shown in FIG. 4E.

Implementation Example 2

A shape memory alloy is used as stretchable material.

1. A shape memory alloy with critical temperature higher than PMMA's glass transition temperature is selected. Suitable materials include TiNi base shape memory alloy, etc. The shape memory alloy is stretched at room temperature.

2. Same as step 1 in Implementation Example 1, an array of aligned carbon nanotubes 2 is grown on a quartz substrate 1 as shown in FIGS. 1A and 1B.

3. The array of aligned carbon nanotubes is transferred onto a shape memory alloy: (1) an electron-beam resist PMMA 3 600K is spin-coated on the carbon nanotubes 2 grown on the quartz substrate 1 at a rotation speed of 2000 rad/s. After drying, the resulting composite (shown in FIG. 2A) is immersed into a HF buffer solution for 48 hours to dissolve the quartz substrate 1. A composite of a PMMA film 3 and carbon nanotubes 2 is obtained as shown in FIG. 2B. (2)

The composite is immersed in deionized water for 10 minutes to remove residual HF in the PMMA film 3. The side of the composite without carrying the carbon nanotubes 2 is attached to the stretched shape memory alloy (as shown in FIG. 2C, except for the stretched shape memory metal is used in place of the stretched PDMS film 4). The alignment direction of the carbon nanotubes 2 is perpendicular to the stretching (and the retracting) direction of the shape memory alloy. A composite structure is obtained, comprising: in sequence, the carbon nanotubes, the PMMA film, and the stretched shape memory alloy.

4. The shape memory alloy in the composite structure is allowed to retract and to shrink back to its original un-stretched state by heating the composite structure to above a transformation temperature of the shape memory alloy. The density of the carbon nanotubes is increased in the shrinking process.

5. The carbon nanotubes are transferred to a target substrate. The target substrate (such as a silicon wafer) can receive the same surface treatments as in step 4 of Implementation_Example 1. A drop of deionized water is dropped on the target substrate. The side of the composite structure having the carbon nanotubes is attached to the target substrate (FIG. 4B). After the water in the gap evaporates, a strongly bonded composite structure is obtained, comprising: the coated target substrate, the carbon nanotubes, the PMMA film, and the shape memory alloy. The shape memory alloy is then dissolved using a metal etchant (FIG. 4C). The PMMA film 3 is then dissolved using acetone (FIG. 4D), and blown dry with a nitrogen gas. An array of high density carbon nanotubes 2 is now transferred to the target substrate (FIG. 4E).

While this document contains many specifics, these should not be construed as limitations on the scope of an invention that is claimed or of what can be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or a variation of a sub-combination.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. A method for increasing density of aligned carbon nanotubes, comprising the following steps:
    (a) transferring aligned carbon nanotubes from an initial substrate to a stretched retractable film to obtain a composite structure comprising the aligned carbon nanotubes and the stretched retractable film, wherein the carbon nanotubes are aligned perpendicular to a retracting direction of the retractable film,
    wherein step (a) further comprises:
        coating a polymer transfer material on the aligned carbon nanotubes on the initial substrate;
        removing the initial substrate to form a composite of the aligned carbon nanotubes and a transfer film made of the polymer transfer material; and
        attaching the aligned carbon nanotubes in the composite of the aligned carbon nanotubes and the transfer film to the stretched retractable film;
    (b) shrinking the retractable film in the composite structure along the retracting direction to increase density of the aligned carbon nanotubes; and
    (c) transferring the aligned carbon nanotubes in the composite structure to a target substrate.

2. The method of claim 1, wherein the carbon nanotubes are distributed in an array of aligned carbon nanotubes, single carbon nanotubes at low density, or a thin film of carbon nanotubes.

3. The method of claim 1, wherein the initial substrate includes a quartz substrate or a sapphire substrate, wherein the aligned carbon nanotubes are grown on the initial substrate using chemical vapor deposition.

4. The method of claim 1, wherein the retractable film is composed of a polymeric material or a shape memory alloy.

5. The method of claim 4, wherein the polymeric material includes rubber or polyester.

6. The method of claim 1, wherein the polymer transfer material comprises PMMA.

7. The method of claim 6, wherein the retractable film is shrunk at a temperature above a glass transition temperature of PMMA.

8. The method of claim 1, wherein the step (c) further comprises:
    attaching the aligned carbon nanotubes in the composite structure to the target substrate;
    dissolving the retractable film; and
    dissolving the polymer transfer material to leave the aligned carbon nanotubes on the target substrate.

9. The method of claim 1, wherein the step (a) further comprises:
    forming a metal layer on a surface of the stretched retractable film; and
    attaching the aligned carbon nanotubes in the composite of the aligned carbon nanotubes and the transfer film to the metal layer on the stretched retractable film.

10. The method of claim 9, wherein the step (c) further comprises:
    attaching the aligned carbon nanotubes in the composite structure to the target substrate;
    dissolving the metal layer using a metal etchant to lift off the retractable film; and
    dissolving the polymer transfer material to leave the aligned carbon nanotubes on the target substrate.

11. The method of claim 1, further comprising:
    treating the target substrate by UV irradiation and/or oxygen plasma bombardment before the step (c).

12. The method of claim 1, further comprising:
    coating the target substrate by a layer of organic molecules, wherein the aligned carbon nanotubes in the composite structure are transferred onto to the layer of organic molecules on the target substrate.

13. The method of claim 1, wherein the step (c) further comprises:
    lifting the retractable film off the composite structure to leave the aligned carbon nanotubes on the target substrate.

14. The method of claim 1, wherein the retractable film comprises a shape memory alloy, wherein the step (b) further comprises heating the shape memory alloy above a transformation temperature of the shape memory alloy to shrink the retractable film.

15. The method of claim 14, wherein the step (c) further comprises:
   attaching the aligned carbon nanotubes in the composite structure to the target substrate; and
   dissolving the shape memory alloy by a metal etchant.

16. The method of claim 14, wherein in the step (c), the retractable film is lifted off mechanically or is directly tore off.

* * * * *